H. L. JOHNSON.
COMBINATION CLUTCH AND BRAKE CONTROL.
APPLICATION FILED JAN. 22, 1919.
1,359,385.
Patented Nov. 16, 1920.
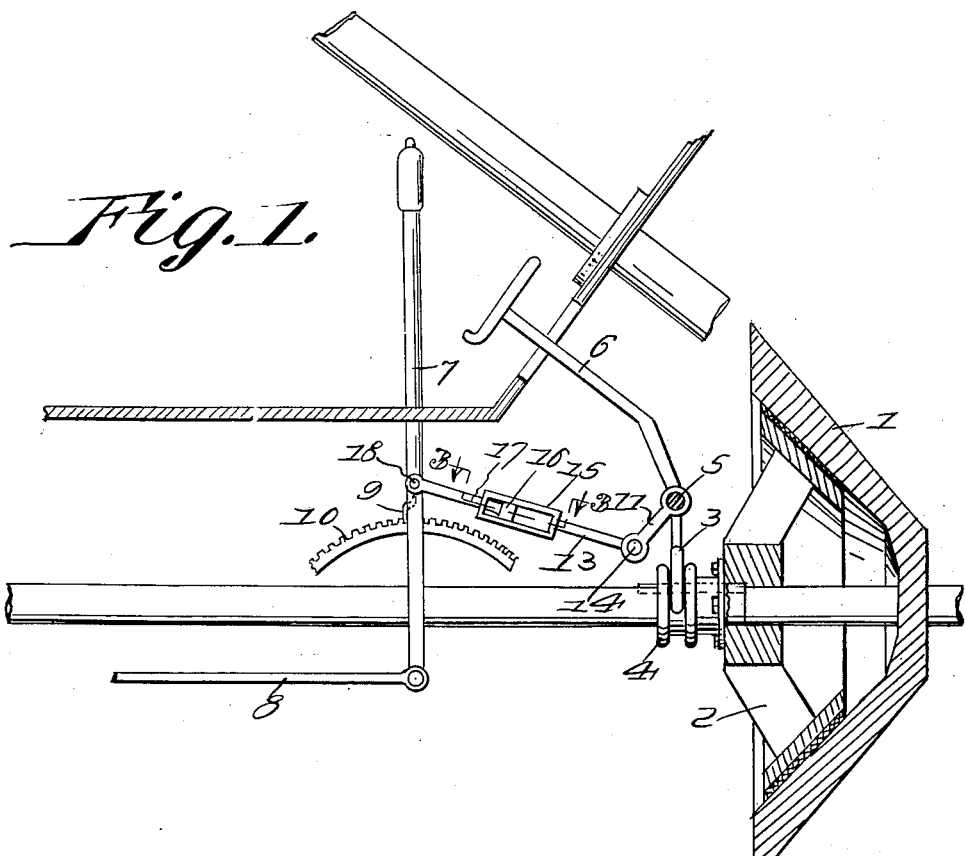
Fig.1.
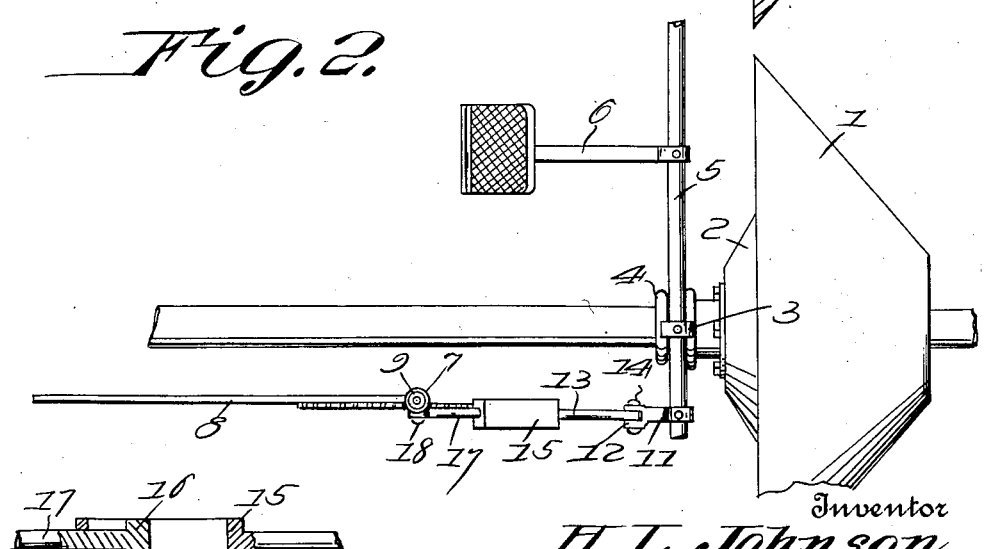
Fig.2.
Fig.3.
Inventor
H. L. Johnson,
By
Attorney

UNITED STATES PATENT OFFICE.

HAYWARD L. JOHNSON, OF MOLINE, KANSAS.

COMBINATION CLUTCH AND BRAKE CONTROL.

1,359,385.  Specification of Letters Patent.  Patented Nov. 16, 1920.

Application filed January 22, 1919. Serial No. 272,592.

*To all whom it may concern:*

Be it known that I, HAYWARD L. JOHNSON, citizen of the United States of America, residing at Moline, in the county of Elk and State of Kansas, have invented new and useful Improvements in Combination Clutch and Brake Control, of which the following is a specification.

The object of the invention is to provide a device for use in conjunction with the clutch pedal and brake lever of an auto vehicle, whereby the clutch cannot be thrown in when the brake is set, or the brake operated without throwing out the clutch. To this end the invention comprises a connection between the clutch pedal and the brake lever, which positively effects the object recited above, but accomplishes this object in such a way that the clutch is under full control—that is, it can be thrown in or out—when the brake lever is in the position where the brake is released.

In the accompanying drawings in which the same numerals of reference designate the same parts—

Figure 1 is a view partly in section and partly in elevation, showing the invention and such parts of an auto vehicle as are affected thereby.

Fig. 2 is a top plan view of the structure of Fig. 1.

Fig. 3 is the enlarged detail sectional view on the line 3—3 of Fig. 1.

Referring to the drawings: There are shown the driving, and driven elements 1 and 2, of an auto vehicle clutch, the driven element being thrown into or out of engagement with the driving element by means of a fork 3 which straddles and operatively engages a thimble 4 connected with the driven element. This fork 3 is carried by, and depends from a transversally disposed rock-shaft 5 which a foot pedal 6 is connected, for the obvious purpose of operating the driven clutch element 2.

The brake lever 7 shown is of the usual character, and has pivotally connected thereto, a link 8, the forward end only of which is shown, but which is presumed to connect with and operate on the usual brake mechanism at the rear of the vehicle. The brake lever 7 carries a spring latch 9 which is engagable with a tooth sector 10, for the purpose of securing the brake lever in its various adjusted positions, and thereby to hold the brakes on or off.

Mounted upon the shaft 5 between the fork 3 and pedal 6 there is an arm 11, the fork end, 12, of which receives between the forks one end of a rod 13 which pivotally engages a pin 14 secured in the legs of the forks. At the end remote from this pivotally connected end, the rod connects with a slide-bearing 15, this connection being rigid, and this slide-bearing carries a slide 16 with which a rod 17 is threadingly engaged, the latter passing loosely through an eye formed in that end of the slide-bearing remote from that end which connects with rod 13. This rod 17 at the remaining end is pivotally connected, as at 18, to the brake lever 7.

In the operation of the device, the position of the brake lever as shown in Fig. 1, is the position in which the brakes are released. In such a position the slide is farthest removed from that end of the slide-bearing which connects with the rod 13, but such position of these parts permits the rock-shaft 5 to assume a position that will allow the driven element 2 to engage the driving element 1. Depression of the foot lever 6 will affect disengagement of the two clutch elements by moving the element 2 backwardly, such a move imparted to the pedal rocking the shaft 5 and causing the fork to draw the element 2 away from the element 1, and this without interference from the brake lever 7, inasmuch as the slide-bearing may move relative to the slide. Thus the clutch may be thrown in or out with the brakes off. If the brakes are thrown on, however, the slide 16 abuts that end of the slide-bearing through which the rod 17 passes, and in that way exerts a pull on the arm 11, thus rocking the shaft 5 to draw the clutch element 2 out of engagement with the clutch element 1, so with the setting of the brakes the clutch is automatically disconnected. Also the clutch is precluded from being thrown in with the brake set as the connection between the lever 7 and the arm 13 will not permit the shaft 5 to be rocked in the direction necessary for affecting the throwing in of the clutch.

The invention having been described what is claimed as new and useful, is:

The combination with the hand brake lever and driven clutch element of an auto vehicle, of a transversely disposed rock shaft, the driven clutch element being formed with a thimble, a foot pedal connected with the rock shaft and provided at one extremity with a fork operatively engaging the thimble, an arm connected with the rock shaft, a rod having one end pivotally connected to the extremity of said arm and the other end formed with a slide bearing, a slide mounted in said slide bearing, and a rod having one end pivotally connected to the hand lever and the other end fixedly connected to said slide, the rod passing slidably through that end of the slide bearing remote from the rod with which the slide bearing is formed, whereby the driven clutch element may be thrown into and out of operative position by the pedal to preclude it from being thrown into operative position except when the brake lever is in released position.

In testimony whereof I affix my signature.

HAYWARD L. JOHNSON.